(No Model.)
G. H. SEYMOUR.
MEMORANDUM TABLET.
No. 481,429. Patented Aug. 23, 1892.
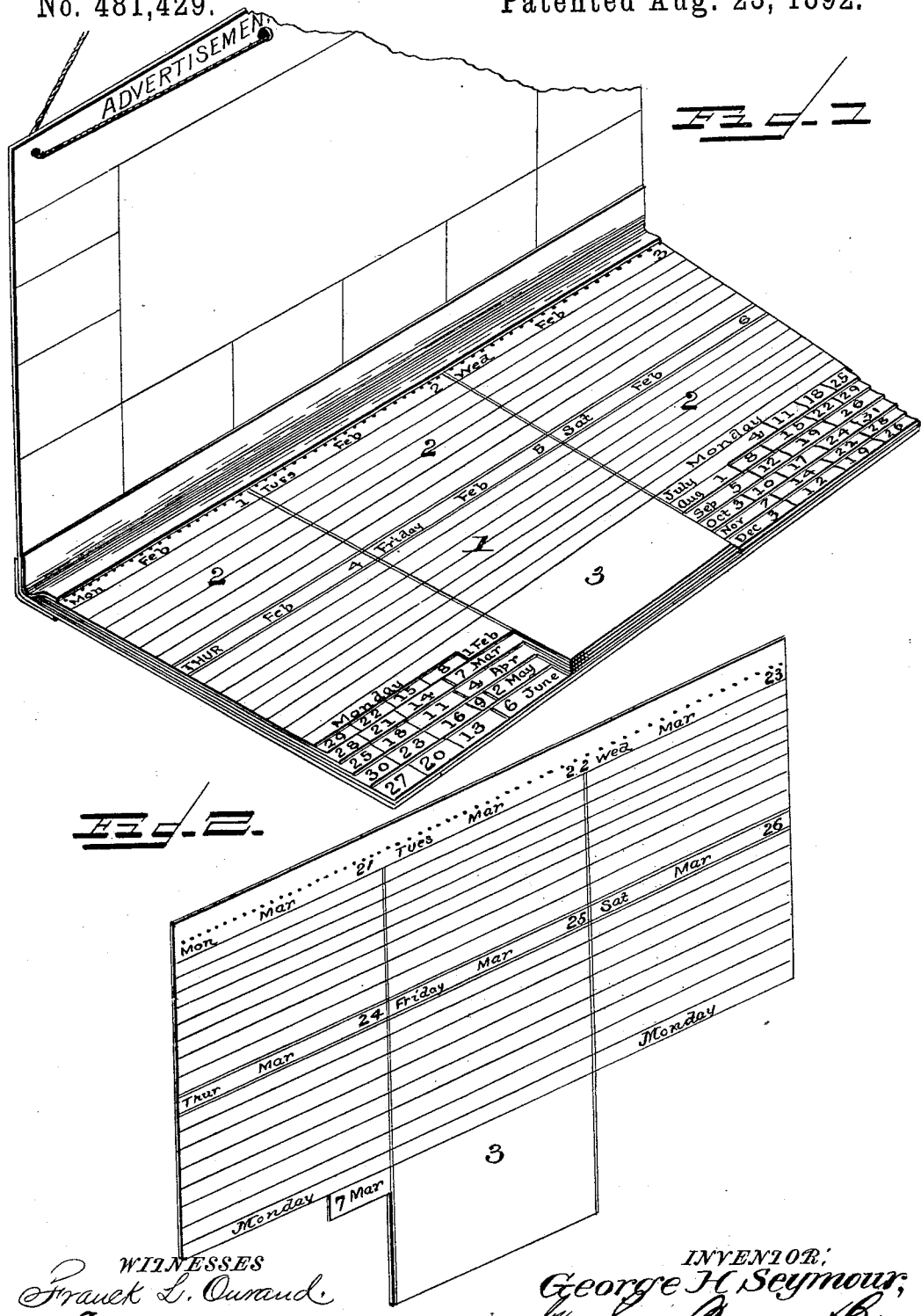
WITNESSES
Franck L. Ourand
Jo. L. Coombs
INVENTOR
George H. Seymour
by Saus Bagger & Co.
Attorneys
THE NORRIS PETERS CO., PHOTO-LITHO., WASHINGTON, D. C.

United States Patent Office.

GEORGE H. SEYMOUR, OF STANTON, TEXAS, ASSIGNOR OF ONE-HALF TO WILLIAM H. FUSCH, OF SAME PLACE.

MEMORANDUM-TABLET.

SPECIFICATION forming part of Letters Patent No. 481,429, dated August 23, 1892.

Application filed March 18, 1892. Serial No. 425,468. (No model.)

*To all whom it may concern:*

Be it known that I, GEORGE H. SEYMOUR, a citizen of the United States, and a resident of Stanton, in the county of Martin and State of Texas, have invented certain new and useful Improvements in Memorandum-Tablets; and I do hereby declare that the following is a full, clear, and exact description of the invention, which will enable others skilled in the art to which it appertains to make and use the same, reference being had to the accompanying drawings, which form a part of this specification.

My invention relates to improvements in what are known commercially as "ticklers" or books or tablets for containing memoranda. As ordinarily constructed these tablets consist of a series of twelve leaves—one for each month—connected together and having printed thereon the days of the month and the days of the week corresponding therewith.

My invention consists, essentially, in a tablet or tickler consisting of fifty-two connected sheets divided into six spaces for the six business days of the week, with the day of the week, month, and day of month provided above each space, the pages being indexed at the bottom—the first six months of the year at the left and the last six months at the right—with an intermediate space for advertisements, as will be hereinafter fully described and claimed.

In the accompanying drawings, Figure 1 represents a perspective view of a memorandum-tablet or tickler constructed in accordance with my invention. Fig. 2 is a view of one of the sheets or leaves detached.

In the said drawings, the reference-numeral 1 denotes the leaves or sheets connected at the top and perforated, as shown, so as to be readily detachable, or, if desired, they may be bound in book form; but this of course is immaterial. Each of the leaves (there being one for each week of the year) is preferably ruled and is divided into six spaces, (marked 2,) arranged in two parallel rows of three spaces each. At the top of these spaces are printed the names of the six business days of the week in regular order, the month and day of the month corresponding with the day of the week.

Near the bottom of each leaf or sheet, at each side, is printed the name of the first business day of the week—viz., "Monday"—and each leaf has printed thereon the name of the month, forming two parallel lines of six each, the first six months being at the left and the last six months at the right, and also with the date of the month corresponding with the Monday or first day of that particular leaf. For instance, as shown in Fig. 2, the leaf which represents the third week of March has printed at the bottom the letters "Mar." and the numerals "21," thus indicating that the first day of that leaf is "Monday, March 21." The leaves are cut away, as shown, so that all the names and numerals at the bottom will be visible at a glance—that is to say, the name of each month is plainly in view and also the date of each Monday in such month.

The space intermediate of the two rows of months marked 3 can be utilized for advertising purposes.

The device is for the use of business, professional, and other persons, wherein notes or memoranda may be made of transactions to be attended to at some future time, which are liable to be forgotten, and the manner of using the same is as follows: Desiring to be reminded of a transaction or engagement—such as a note or bill falling due on a certain day or a trial coming off—the week in which said day occurs is found out by the index, and the leaf corresponding with such week is turned to, which can be readily done by means of the cut-away lower ends of the leaves, like in an ordinary index-book. A note or memorandum of the transaction is then made in the proper space on said leaf.

One page is torn off each week, displaying to view the transactions demanding the attention the following week, as usual.

The device is to be hung up in some convenient space, and instead of the leaves being connected together, as shown, they may be bound together in book form, as will be obvious.

Having thus described my invention, what I claim is—

A memorandum-tablet or tickler consisting of fifty-two connected leaves, each divided into six spaces marked with the six business days of the week and the corresponding month and day thereof, and the index at the bottom having the name of the month and the date of the first business day of the week corresponding to the leaf printed thereon and said leaves cut away, so that all the names and numerals thereon will be visible, substantially as and for the purpose set forth.

In testimony that I claim the foregoing as my own I have hereunto affixed my signature in presence of two witnesses.

GEORGE H. SEYMOUR.

Witnesses:
M. F. LOVELACE,
J. B. SAUERS.